(12) United States Patent
Xing

(10) Patent No.: US 8,047,490 B2
(45) Date of Patent: Nov. 1, 2011

(54) ELEVATION ROTATING MECHANISM AND DISPLAY DEVICE USING THE SAME

(75) Inventor: Hua-Yun Xing, Suzhou (CN)

(73) Assignee: Qisda Corporation, Taoyuan County (TW)

( * ) Notice: Subject to any disclaimer, the term of this patent is extended or adjusted under 35 U.S.C. 154(b) by 875 days.

(21) Appl. No.: 12/073,604

(22) Filed: Mar. 7, 2008

(65) Prior Publication Data
US 2008/0230671 A1 Sep. 25, 2008

(30) Foreign Application Priority Data
Mar. 20, 2007 (TW) ................................ 96109591 A

(51) Int. Cl.
*E04G 3/00* (2006.01)
(52) U.S. Cl. ................. 248/296.1; 248/297.21; 248/920
(58) Field of Classification Search ............ 248/295.11, 248/296.1, 918, 297.21, 919, 920, 922, 923; 361/679.05, 679.06, 679.07, 679.21
See application file for complete search history.

(56) References Cited

U.S. PATENT DOCUMENTS

| 4,616,218 A * | 10/1986 | Bailey et al. ............. 361/679.21 |
| 7,387,572 B2 * | 6/2008 | Hanchar ......................... 463/46 |
| 7,478,784 B2 * | 1/2009 | Wang ............................ 248/161 |

* cited by examiner

*Primary Examiner* — Gwendolyn W Baxter

(57) ABSTRACT

An elevation rotating mechanism is for elevating and rotating a monitor. The elevation rotating mechanism includes two supporting structures, two guiding structures, two connecting stands and two rotating shafts. The supporting structures are respectively disposed at two sides of the monitor for supporting the monitor. The guiding structures are respectively received in the supporting structures. Each of the guiding structures includes at least one rail, a guiding stand and an elastic fixing element. The rail is disposed at an inner wall of the guiding structure. The guiding stand is coupled to the rail. One end of the elastic fixing element is coupled to the guiding stand. The other end of the elastic fixing element is connected to the connecting stand. The connecting stands are movably connected to the rails, respectively. The rotating shafts are inserted into the connecting stands and fixedly connected to the monitor, respectively.

13 Claims, 7 Drawing Sheets

ELEVATION ROTATING MECHANISM AND DISPLAY DEVICE USING THE SAME

This application claims the benefit of Taiwan application Serial No. 96109591, filed Mar. 20, 2007, the subject matter of which is incorporated herein by reference.

BACKGROUND OF THE INVENTION

1. Field of the Invention

The invention relates in general to an elevation rotating mechanism and a display device using the same, and more particularly to an elevation rotating mechanism capable of adjusting the angle and the height of a monitor and a display device using the same.

2. Description of the Related Art

Most conventional adjusting mechanisms for adjusting the height or the angle of the monitor are disposed at the back of the monitor. Referring to FIG. 1A, a conventional adjusting mechanism is illustrated. The adjusting mechanism 100 disposed at the back of the monitor 120 has a supporting element 101 and a rotating element 105. The supporting element 101 is coupled to the rotating element 105. The rotating element 105 is movable coupled to the back of the monitor 120, so that the monitor 120 is rotatable in the rotating direction R1. However, the adjusting mechanism 100 is only used for adjusting the angle of the monitor 120.

Referring to FIG. 1B, another conventional adjusting mechanism is illustrated. The adjusting mechanism 150 disposed at the back of the monitor 120 has a rotating element 155 and a supporting element 151. The rotating element 155 is movably coupled to the back of the monitor 120, so that the monitor 120 is rotatable in the rotating direction R2. As the supporting element 151 is a quadric-chain linkage, the height of the monitor 120 can be adjusted in the vertical direction D1 when the supporting element 151 is operated.

Despite the adjusting mechanism 150 is capable of adjusting the height and the angle of the monitor 120, the adjusting mechanism 150, being a quadric-chain linkage, needs large accommodation space. In addition, the adjusting mechanisms 100 and 150 might be unbalanced because of disposing at the back of the monitor 120.

SUMMARY OF THE INVENTION

The invention is directed to an elevation rotating mechanism and a display device using the same. The elevation rotating mechanism disposed at two sides of a monitor is used for adjusting the height and the angle of the monitor.

According to a first aspect of the present invention, an elevation rotating mechanism is provided. The elevation rotating mechanism is for elevating and rotating a monitor. The elevation rotating mechanism comprises two supporting structures, two guiding structures, two connecting stands and two rotating shafts. The supporting structures are disposed at two sides of the monitor for supporting the monitor, respectively. The guiding structures are respectively received in the supporting structures. Each of the guiding structures comprises at least one rail, a guiding stand and an elastic fixing element. The rail is disposed at an inner wall of the guiding structure. The guiding stand is coupled to the rail. One end of the elastic fixing element is coupled to the guiding stand and the other end of the elastic fixing element is connected to the connecting stand. The connecting stands are movably connected to the rails, respectively. The rotating shafts are inserted into the connecting stands and fixedly connected to the monitor, respectively.

According to a second aspect of the present invention, a display device is provided. The display device comprises a monitor and an elevation rotating mechanism. The elevation rotating mechanism is for elevating and rotating the monitor. The elevation rotating mechanism comprises two supporting structures, two guiding structures, two connecting stands and two rotating shafts. The supporting structures are disposed at two sides of the monitor for supporting the monitor, respectively. The guiding structures are respectively received in the supporting structures. Each of the guiding structures comprises at least one rail, a guiding stand and an elastic fixing element. The rail is disposed at an inner wall of the guiding structure. The guiding stand is coupled to the rail. One end of the elastic fixing element is coupled to the guiding stand and the other end of the elastic fixing element is connected to the connecting stand. The connecting stands are movably connected to the rails, respectively. The rotating shafts are inserted into the connecting stands and fixedly connected to the monitor, respectively.

The invention will become apparent from the following detailed description of the preferred but non-limiting embodiments. The following description is made with reference to the accompanying drawings.

DETAILED DESCRIPTION OF THE INVENTION

Figure 1A:
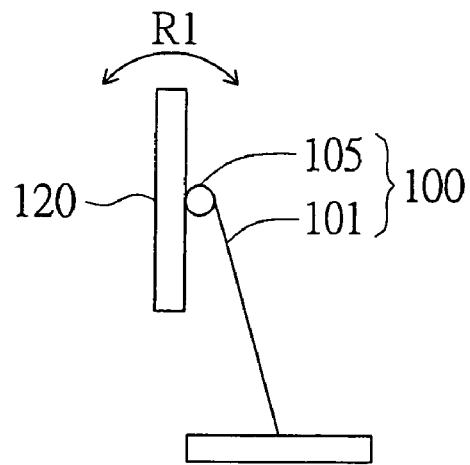
FIG. 1A (Prior Art) illustrates a conventional adjusting mechanism.
Figure 1B:
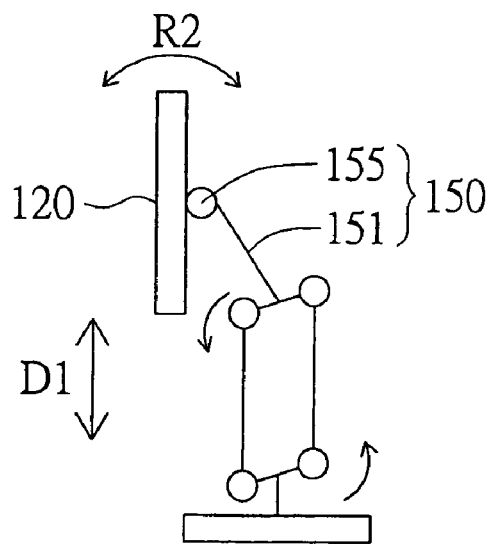
FIG. 1B (Prior Art) illustrates another conventional adjusting mechanism.
Figure 2:
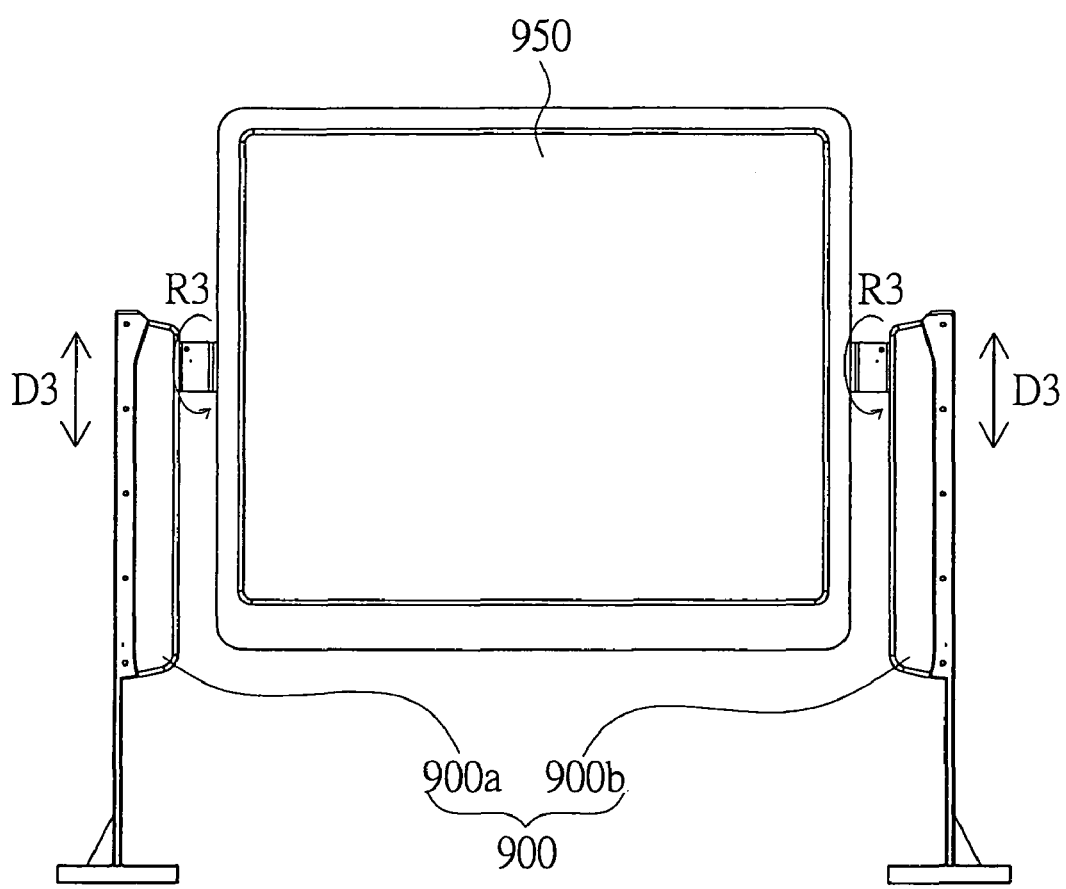
FIG. 2 is a perspective view of a display device according to a preferred embodiment of the invention.

Referring to FIG. 2, a perspective view of a display device according to a preferred embodiment of the invention is shown. The display device 1000 includes a monitor 950 and an elevation rotating mechanism 900. The elevation rotating mechanism 900 can adjust the height of the monitor 950 in a vertical direction D3, and the monitor 950 is also rotatable in the rotating direction R3 as a result of the operation of the elevation rotating mechanism 900, so that the monitor 950 can be rotated to a required angle.

Figure 3A:
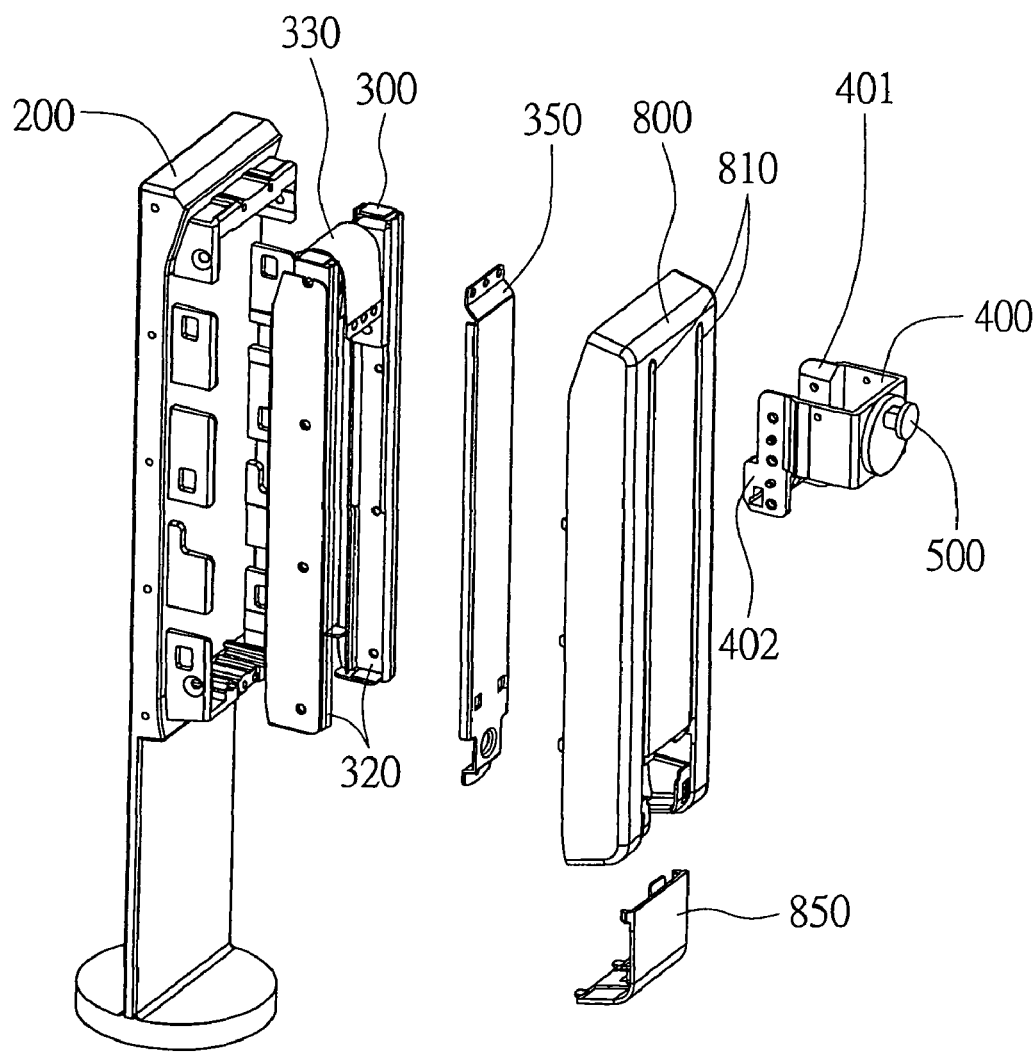
FIG. 3A is an exploded view of the left mechanism of the elevation rotating mechanism in FIG. 2.

As indicated in FIG. 2, the elevation rotating mechanism 900 includes a left mechanism 900a and a right mechanism 900b. As the elevation rotating mechanism 900 is a symmetric mechanism, only the left mechanism 900a is taken to be an example. Referring to FIG. 3A, an exploded view of the left mechanism of the elevation rotating mechanism in FIG. 2 is shown. The left mechanism 900a includes a supporting structure 200, a supporting cover 800, a lower cover 850, an inner cover 350, a guiding structure 300, a connecting stand 400 and a rotating shaft 500.

The supporting structure 200 is disposed at a side of the monitor 950 (as shown in FIG. 2) for supporting the monitor 950. The guiding structure 300 is received in the supporting structure 200. The guiding structure 300 includes, for example, two rails 320, a guiding stand 340 (illustrated in FIG. 4) and an elastic fixing element 330. The rails 320 are disposed at inner walls of the guiding structure 300. The guiding stand 340 is coupled to and disposed between the two rails 320. One end of the elastic fixing element 330 is coupled to the guiding stand 340 and the other end of the elastic fixing element 330 is connected to the connecting stand 400. The inner cover 350 passes through the connecting stand 400 to couple to the guiding structure 300 for further fixing the elastic fixing element 330 and the rails 320 firmly. The supporting cover 800 is disposed between the supporting structure 200 and the connecting stand 400 and is coupled to the supporting structure 200. The supporting cover 800 has two sliding grooves 810 disposed at a side of the supporting cover 800. A first lateral plate 401 and a second lateral plate 402 of the connecting stand 400 pass through the sliding grooves 810 and are coupled to the rails 320, respectively. Moreover, the lower cover 850 is connected to the supporting structure 200 and the supporting cover 800. The guiding structure 300, the elastic fixing element 330 and the inner cover 350 are covered by the lower cover 850 and the supporting cover 800, so that the supporting structure 200 has a pleasant appearance. Although two rails 320 are disposed in the guiding structure 300 in the present embodiment of the invention, the invention is not limited thereto. One rail in the guiding structure is practical as well.

In addition, the rotating shaft 500 is inserted into the connecting stand 400 and is fixedly connected to the monitor 950 (as indicated in FIG. 2).

Figure 3B:
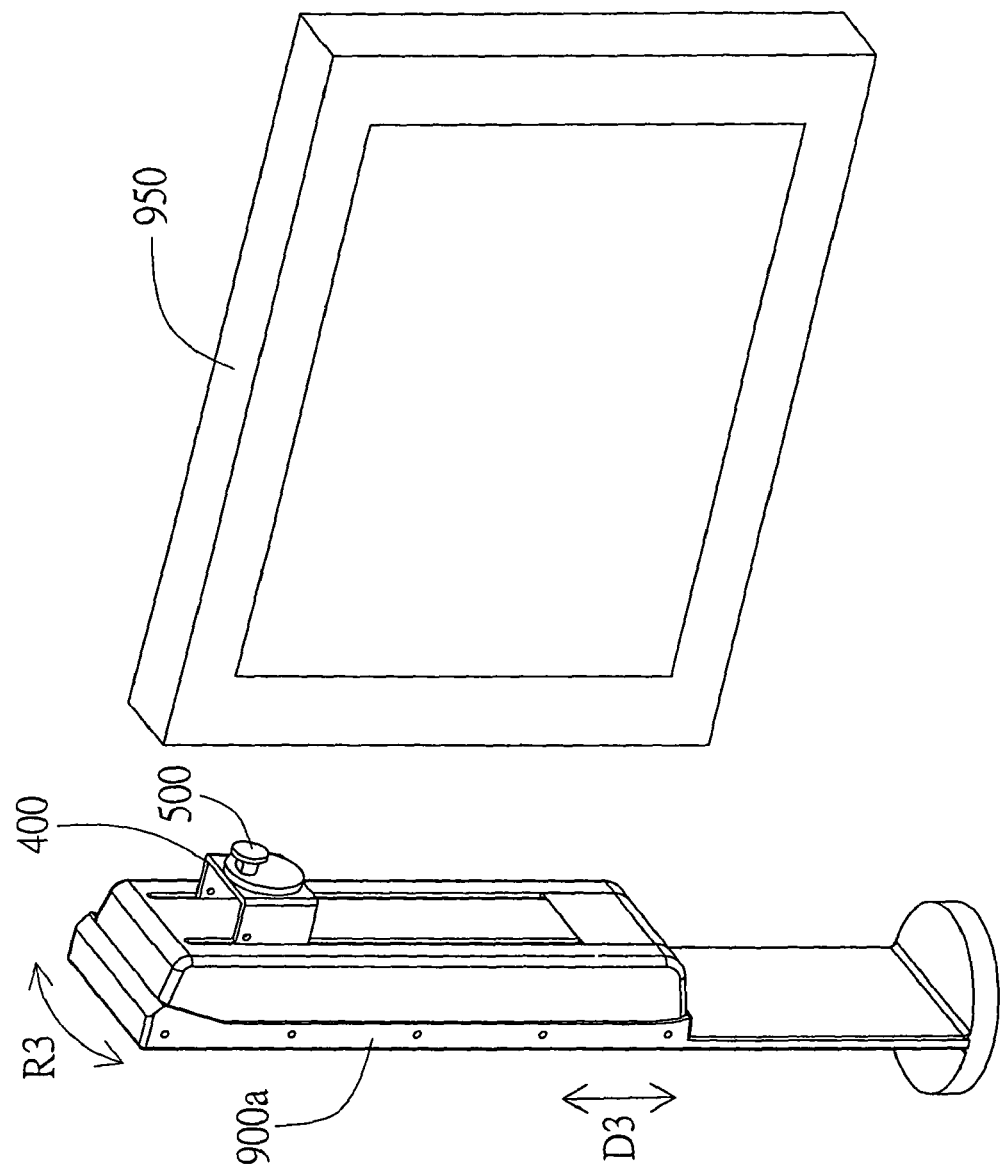
FIG. 3B is a perspective view of the monitor and the assembled left mechanism in FIG. 3A.

Referring to both FIG. 3A and FIG. 3B. FIG. 3B is a perspective view of the monitor and the assembled left mechanism in FIG. 3A. When the connecting stand 400 slides along the rails 320, the monitor 950 driven by the connecting stand 400 via the rotating shaft 500 moves along the vertical direction D3. Meanwhile, elastic force generated by the elastic fixing element 330 is provided to the connecting stand 400, so that the connecting stand 400 is positioned. When the rotating shaft 500 rotates, the monitor 950 is driven to rotate accordingly in the rotating direction R3.

The above elements are further elaborated as follows. As shown in FIG. 2, the elevation rotating mechanism 900 includes the left mechanism 900a and the right mechanism 900b. As the elements and the functions of the right mechanism 900b are the same with those of the left mechanism 900a, only the left mechanism 900a is taken to be an example.

Figure 4:
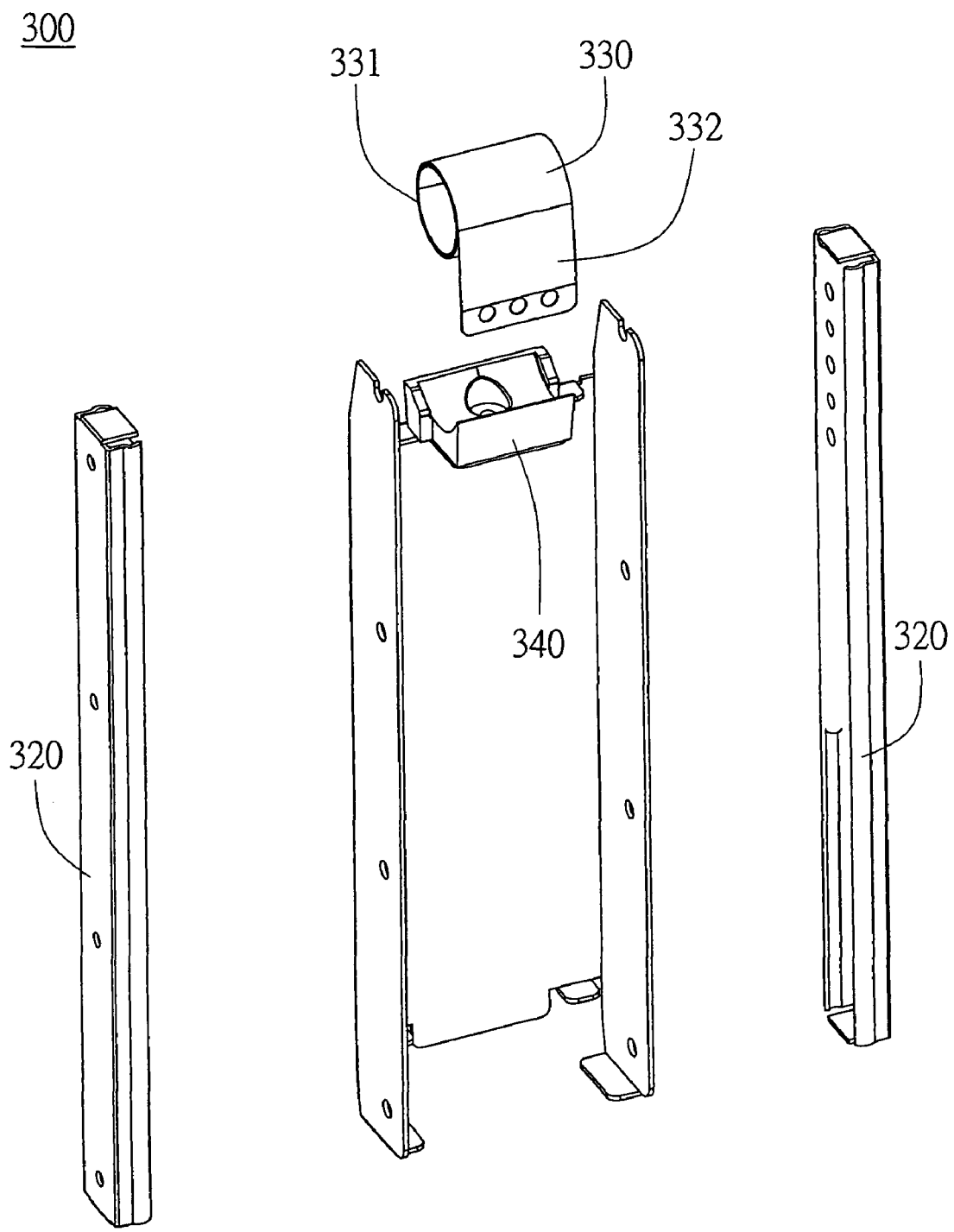
FIG. 4 is an exploded view of the guiding structure in FIG. 3A.

Referring to FIG. 4, an exploded view of the guiding structure in FIG. 3A is shown. The guiding structure 300 includes the two rails 320, the elastic fixing element 330, the guiding stand 340 and several balls (not illustrated). The rails 320 are disposed at inner walls of the guiding structure 300. The guiding stand 340 is coupled to the rails 320. In the present embodiment of the invention, two rails 320 are disposed at the inner walls of the guiding structure 300, but one rail is practical as well. A first end 331 of the elastic fixing element 330 is coupled to the guiding stand 340, and a second end 332 of the elastic fixing element 330 is coupled to the connecting stand 400 (as indicated in FIG. 3A).

The elastic fixing element 330 is, for example, a constant force spring. When the elastic fixing element 330 slides along with the connecting stand 400, the length of the elastic fixing element 330 changes and elastic force is generated accordingly. The elastic force is provided to the connecting stand 400 for positioning, so that the monitor 950 is supported (as indicated in FIG. 2). Moreover, the balls are disposed at the guiding structure 300 for reducing the friction force generated when the connecting stand 400 slides along the rails 320. The friction force can be reduced by adding lubricants between the connecting stand and the rails as well.

Figure 5:
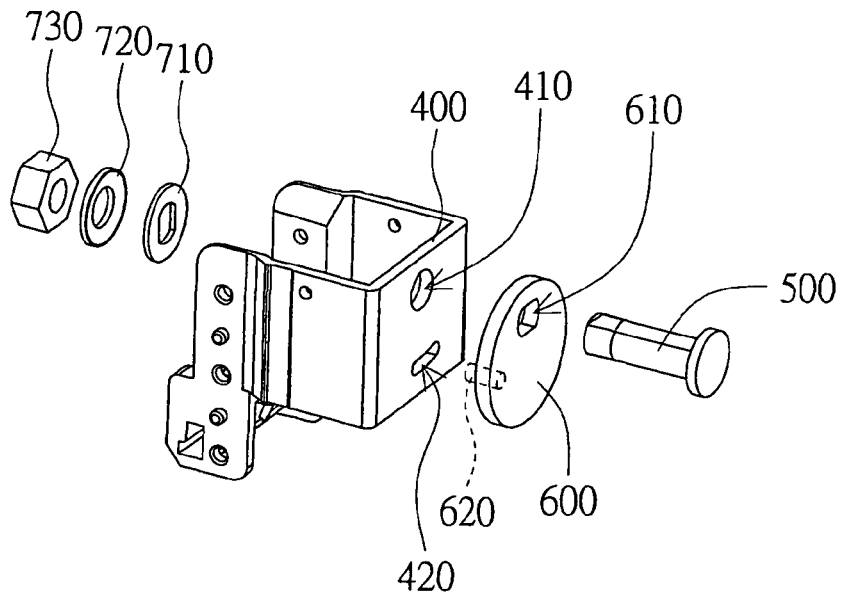
FIG. 5 is a partial exploded view of the elevation rotating mechanism in FIG. 3A.

Referring to FIG. 5, a partial exploded view of the elevation rotating mechanism in FIG. 3A is shown. The connecting stand 400 has a rotation hole 410 and an arc hole 420. A rotation fixing element 600 is disposed between the connecting stand 400 and the monitor 950 (as indicated in FIG. 3B). The rotation fixing element 600 has a positioning hole 610 and a projection 620. The position of the positioning hole 610 corresponds to the position of the rotation hole 410. The position of the projection 620 corresponds to the position of the arc hole 420.

The rotating shaft 500 passes through the positioning hole 610 and the rotation hole 410 to couple to the monitor 950 (as indicated in FIG. 3B). The rotating shaft 500 can rotate within the rotation hole 410. In the present embodiment of the invention, the cross-sectional shape of the positioning hole 610 matches that of the rotating shaft 500, so that rotation fixing element 600 is engaged with the rotating shaft 500. Thus, when the rotating shaft 500 rotates, the rotation fixing element 600 rotates accordingly, so that the monitor 950 rotates with respect to the connecting stand 400.

The projection 620 of the rotation fixing element 600 is inserted into the arc hole 420 for limiting a rotation range of the rotation fixing element 600 and the rotating shaft 500.

The projection 620 of the rotation fixing element 600 slides within the arc hole 420, so the rotation range of the rotation fixing element 600 is limited by the dimension of the arc hole 420. The rotation range of the rotating shaft 500 and the rotation fixing element 600 is, for example, −5°~21°.

Figure 6:
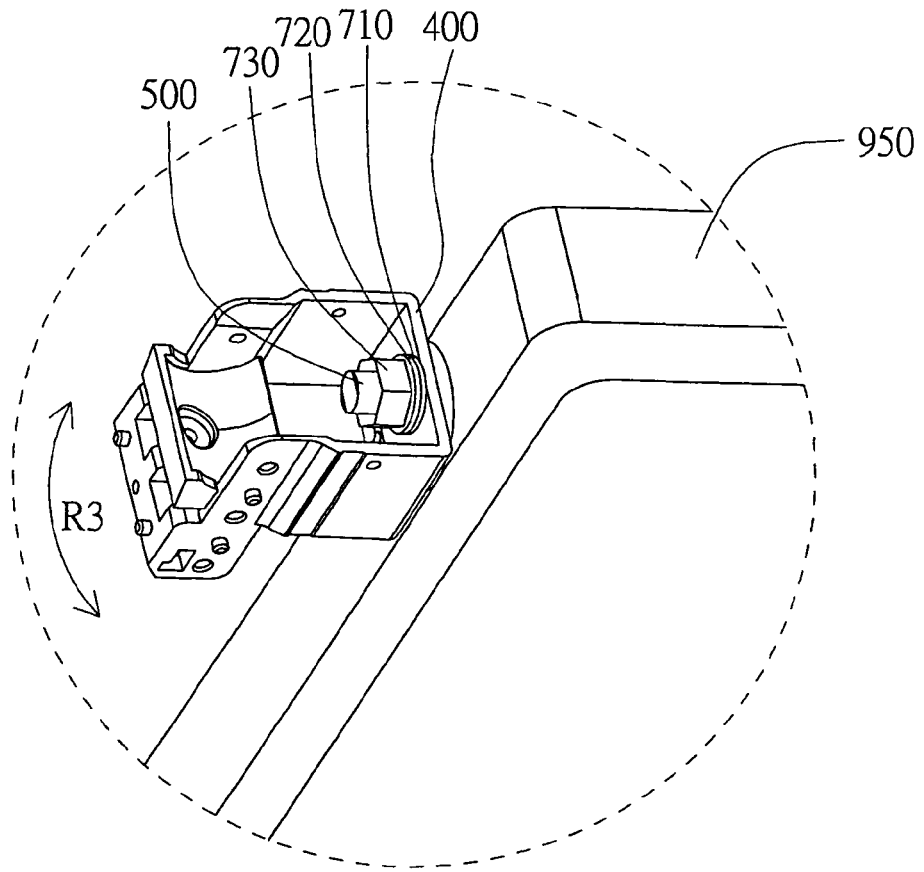
FIG. 6 is a perspective view of the connecting stand and the rotating shaft in FIG. 5 after assembly.

As indicated in FIG. 5, the left mechanism 900a (as shown in FIG. 2) of the elevation rotating mechanism 900 (as shown in FIG. 2) further includes a spacer 710, an elastic spacer 720 and a nut 730. Referring to FIG. 6, a perspective view of the connecting stand and the rotating shaft in FIG. 5 after assembly is shown. The spacer 710, the elastic spacer 720 and the nut 730 are sequentially mounted onto one end of the rotating shaft 500, so that the rotating shaft 500 is coupled to the connecting stand 400. The other end of the rotating shaft 500 is coupled to the monitor 950. When the monitor 950 is driven to a required angle by the rotating shaft 500, the spacer 710 and the elastic spacer 720 provide friction force to position the monitor 950.

Figure 7:
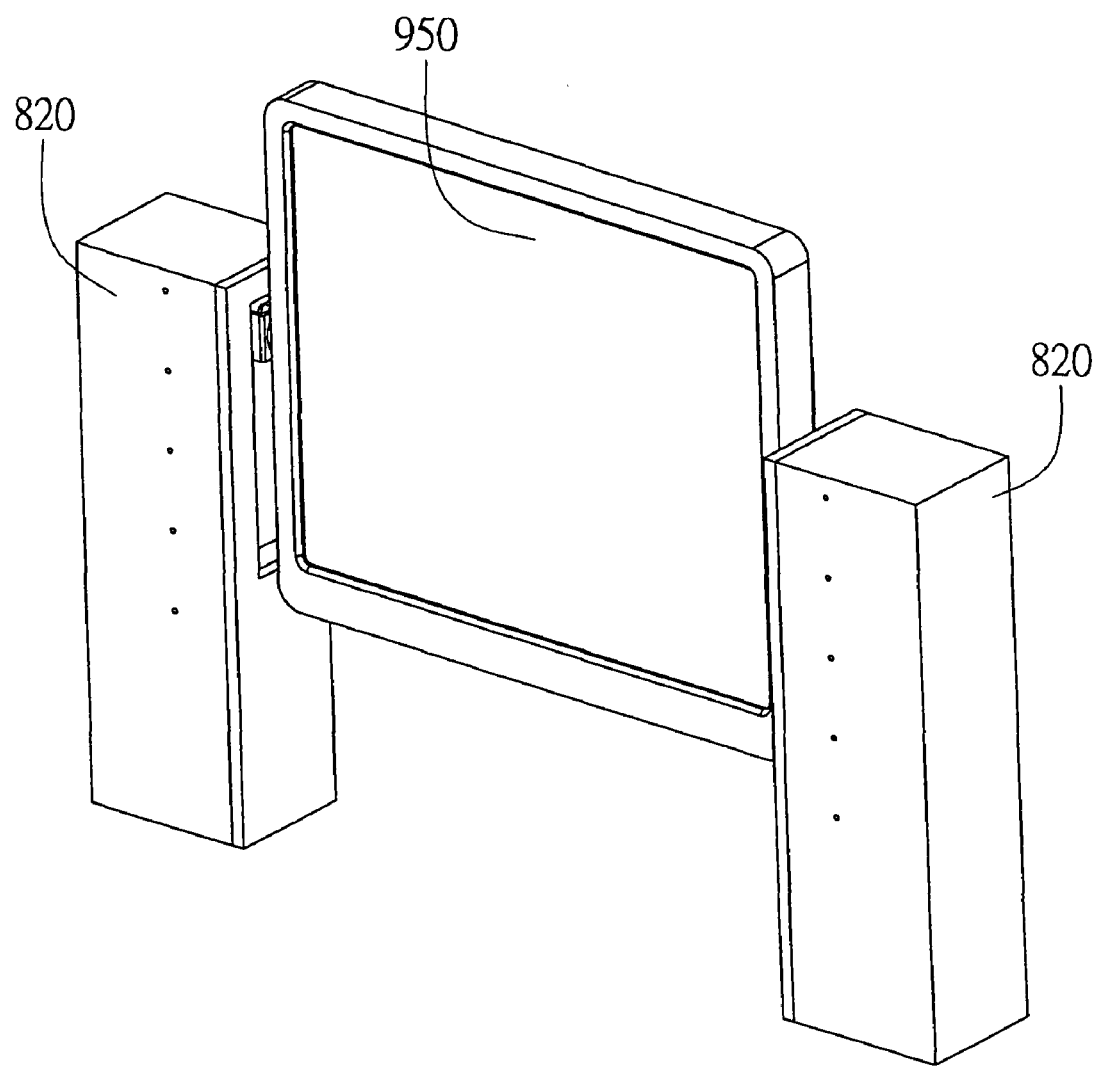
FIG. 7 is a perspective view of the elevation rotating mechanism disposed in two voice boxes.

Referring to FIG. 7, a perspective view of the elevation rotating mechanism disposed in two voice boxes is shown. The two voice boxes 820 are, for example, disposed at two sides of the monitor 950. The voice boxes 820 are used for receiving the right mechanism 900b (as indicated in FIG. 2) and the left mechanism 900a (as indicated in FIG. 2) of the elevation rotating mechanism 900 (as indicated in FIG. 2), respectively. Besides, an audio (not illustrated) can be disposed in the voice boxes 820 to improve the sound effect.

According to the elevation rotating mechanism and the display device using the same disclosed in the above embodiment of the invention, the monitor is driven to ascend or descend in the vertical direction or to rotate in the rotating direction. The elevation rotating mechanism is a symmetric mechanism disposed at the two sides of the monitor, thereby avoiding the unbalanced situation occurring to the conventional adjusting mechanisms 100 and 150. Besides, the elevation rotating mechanism can be combined with other accessories such as voice boxes to improve the appearance and have additional functions.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An elevation rotating mechanism for elevating and rotating a monitor, the elevation rotating mechanism comprising:
    two supporting structures respectively disposed at two sides of the monitor for supporting the monitor;
    two guiding structures respectively received in the supporting structures, and each of the guiding structures comprising:
        at least one rail disposed at an inner wall of the guiding structure;
        a guiding stand coupled to the rail; and
        an elastic fixing element, wherein one end of the elastic fixing element is coupled to the guiding stand;
    two connecting stands movably connected to the rails, respectively, wherein the other end of the elastic fixing element is connected to the connecting stand; and
    two rotating shafts respectively inserted into the connecting stands and fixedly coupled to the monitor, wherein when the connecting stands respectively slide, along the rails, the monitor driven by the connecting stands via the rotating shafts having the ability of up and down movement, and when the rotating shafts rotate, the monitor is driven to rotate accordingly;
    wherein, elastic force is provided to the connecting stands by the elastic fixing element when the connecting stands respectively slide along the rails.

2. The elevation rotating mechanism according to claim 1, wherein the elastic fixing element is a constant force spring.

3. The elevation rotating mechanism according to claim 1, wherein the connecting stands respectively have a rotation hole, and the rotating shafts respectively pass through the rotation holes to couple to the monitor.

4. The elevation rotating mechanism according to claim 3, wherein the rotating shafts are used for rotating within the rotation holes, respectively, so that the monitor rotates with respect to the connecting stands.

5. The elevation rotating mechanism according to claim 4, further comprising:
    a rotation fixing element disposed between one of the connecting stands and the monitor, wherein the rotation fixing element has a positioning hole corresponding to the rotation hole of the connecting stand, and one of the rotating shaft passes through the rotation hole and the positioning hole to couple to the monitor.

6. The elevation rotating mechanism according to claim 5, wherein the cross-sectional shape of the positioning hole matches that of the rotating shaft, so that the rotation fixing element is engaged with the rotating shaft, and when the rotating shaft rotates, the rotation fixing element rotates accordingly.

7. The elevation rotating mechanism according to claim 5, wherein the rotation fixing element has a projection, the connecting stand has an arc hole, and the projection is inserted into the arc hole for limiting the rotation range of the rotation fixing element and the rotating shaft.

8. The elevation rotating mechanism according to claim 7, wherein the rotation range is −5° through 21°.

9. The elevation rotating mechanism according to claim 7, further comprising:
    two supporting covers respectively disposed between the supporting structures and the connecting stands, wherein the supporting cover is coupled to the supporting structure and has two sliding grooves disposed at a side of the supporting cover, and a first lateral plate and a second lateral plate of the connecting stand pass through the sliding grooves to couple to one of the rails.

10. The elevation rotating mechanism according to claim 1, further comprises:
    a spacer;
    an elastic spacer; and
    a nut, wherein the spacer, the elastic spacer and the nut are sequentially mounted onto one of the rotating shafts, so that the rotating shaft is connected to one of the connecting stands, and the spacer and the elastic spacer provide friction force to position the monitor when the monitor is driven to a required angle by the rotating shaft.

11. The elevation rotating mechanism according to claim 1, further comprises:
    a voice box disposed at one side of the monitor, wherein the voice box is used for receiving one of the supporting structures, one of the guiding structures, one of the connecting stands.

12. A display device, comprising:
    a monitor; and
    an elevation rotating mechanism for elevating and rotating the monitor, the elevation rotating mechanism as claimed in claim 1.

13. The display device according to claim 12, further comprises:
    a voice box disposed at one side of the monitor, wherein the voice box is used for receiving one of the supporting structures, one of the guiding structures, one of the connecting stands.

* * * * *